United States Patent
Semura (10) Patent No.: US 9,401,673 B2
(45) Date of Patent: Jul. 26, 2016

(54) CONTROL APPARATUS FOR SYNCHRONOUS ROTARY MACHINE ENABLING SUPPRESSION OF ROTOR VIBRATION

(71) Applicant: DENSO CORPORATION, Kariya, Aichi-pref. (JP)

(72) Inventor: Junichi Semura, Kariya (JP)

(73) Assignee: DENSO CORPORATION, Kariya (JP)

( * ) Notice: Subject to any disclaimer, the term of this patent is extended or adjusted under 35 U.S.C. 154(b) by 53 days.

(21) Appl. No.: 14/554,801

(22) Filed: Nov. 26, 2014

(65) Prior Publication Data

US 2015/0145451 A1 May 28, 2015

(30) Foreign Application Priority Data

Nov. 27, 2013 (JP) ................... 2013-244708
Nov. 12, 2014 (JP) ................... 2014-229854

(51) Int. Cl.
  *H02P 6/10* (2006.01)
  *B60L 1/00* (2006.01)
  *H02P 29/00* (2016.01)
  *H02P 23/00* (2016.01)

(52) U.S. Cl.
  CPC . *H02P 6/10* (2013.01); *B60L 1/003* (2013.01); *H02P 23/0036* (2013.01); *H02P 29/0038* (2013.01)

(58) Field of Classification Search
  CPC ............... H02P 1/24; H02P 6/10; H02P 6/14; H02M 1/44; H02M 1/12
  USPC ............ 318/611, 623, 690, 114, 118, 400.01, 318/400.02, 400.07, 400.09, 400.12, 318/400.14, 400.15, 400.2, 400.23, 400.24, 318/400.26, 400.27, 400.28, 400.39, 318/400.41, 700, 701, 714, 715, 716, 721, 318/722, 723, 727, 748, 756, 772, 773, 778, 318/779, 798, 799, 800, 801, 803, 806, 807, 318/832, 430, 432, 437, 445, 460, 491, 318/496; 310/12.18, 129, 162, 690
  See application file for complete search history.

(56) References Cited

U.S. PATENT DOCUMENTS

| 7,151,354 B2 * | 12/2006 | Yoshinaga | ................ H02J 3/01 318/375 |
| 7,176,652 B2 * | 2/2007 | Wakabayashi | ...... H02P 29/0038 318/400.02 |
| 7,768,220 B2 * | 8/2010 | Schulz | ................ H02P 29/0038 318/400.02 |

FOREIGN PATENT DOCUMENTS

| JP | 4-54872 | 2/1992 |
| JP | 11-55986 | 2/1999 |

* cited by examiner

*Primary Examiner* — Antony M Paul
(74) *Attorney, Agent, or Firm* — Nixon & Vanderhye P.C.

(57) ABSTRACT

In a synchronous rotary machine such as a synchronous motor, respective values of the number of pole pairs of the rotor and the number of stator slots are predetermined such as to enable drive currents to be passed through the stator windings which suppress specific varying electromagnetic forces that act on the rotor and produce vibration. The drive current of each phase of the motor consists of a fundamental-frequency sinusoidal waveform current having specific harmonic-frequency currents superimposed thereon, the harmonic-frequency currents having angular velocities which are appropriate, with respect to the angular variation velocities of the specific varying electromagnetic forces, for suppressing these forces.

9 Claims, 6 Drawing Sheets

CONTROL APPARATUS FOR SYNCHRONOUS ROTARY MACHINE ENABLING SUPPRESSION OF ROTOR VIBRATION

CROSS-REFERENCE TO RELATED APPLICATIONS

This application is based on and incorporates herein by reference Japanese Patent First Application No. 2013-244708 filed on Nov. 27, 2013 and Japanese Patent First Application No. 2014-229854 filed on Nov. 12, 2014.

BACKGROUND OF THE INVENTION

1. Field of Application

The present invention relates to a control apparatus for a polyphase synchronous rotary machine, and in particular to a control apparatus for operating the rotary machine such as to reduce vibration of the rotor and thereby reduce consequent audible noise produced from the rotary machine.

2. Background Technology

Technology is known, as described in Japanese patent publication No. HEI 11-55986 (designated in the following as reference document 1), for reducing the torque ripple of a permanent magnet type of rotary machine. With that technology, data are stored in a memory apparatus expressing torque ripple, such as cogging torque (caused by circumferential variations in magnetic permeance of the stator, due to the wiring slots in the stator iron core). Based on the stored torque data, sinusoidal-waveform currents which flow in the stator windings are compensated such as to reduce the torque ripple.

However when currents are passed through the windings of the stator of a synchronous rotary machine for driving the rotor, varying (i.e., rotating) electromagnetic forces are applied to the rotor, acting (alternately attracting and repelling) in directions at right angles to the rotor axis. When such a varying electromagnetic force has a frequency that is close to a resonance frequency of a vibration mode of the rotor, large-amplitude vibration of the rotor may occur. A high level of audible noise is thereby generated by the rotary machine.

SUMMARY OF THE INVENTION

Hence it is desired to overcome the above problem by providing a control apparatus for a polyphase rotary machine which enables suppression of at least one varying electromagnetic force, varying at a specific frequency (i.e., at a specific angular velocity), which acts on the rotor of the rotary machine in a manner for producing vibration of the rotor.

The invention is applicable to a polyphase rotary machine, such as a synchronous induction motor having a rotor with P pairs of (north/south) poles, P being a positive integer, and a stator having S slots (S being a positive integer ≥3) and wound with stator windings of respective phases.

With such a machine, when drive currents are supplied to the stator windings for effecting rotation of the rotor, currents are induced in the stator windings whereby the aforementioned varying (i.e., rotating) electromagnetic forces are applied to the rotor, i.e., alternately attracting and repelling the rotor. Designating the rotor angular velocity as $\omega m$, these forces have respective angular velocity values obtained by multiplying $\omega m$ by an integral multiple of the number of slots S, i.e., $S\omega m$, $2S\omega m$, $3S\omega m$, .... With the present invention, at least one of these varying electromagnetic forces can be suppressed (and any consequent rotor vibration thereby suppressed) by superimposing on the drive current (of each phase of the stator windings) a harmonic-frequency current, having a frequency that is a specific multiple of the fundamental drive current frequency.

In describing the invention, a value KN obtained by multiplying the lowest common multiple K of the number of slots S and double the number of pole pairs P by N (where N is a positive integer) is designated as the prescribed value. A value obtained by multiplying the sum (KN+S) of the prescribed value and the number of slots S by the angular velocity of the rotor (i.e., mechanical angular velocity, as opposed to electrical angular velocity), and a value obtained by multiplying the difference (KN−S) between the prescribed value KN and the number of slots S by the angular velocity of the rotor, are designated as respective suppression-object angular velocities. The value of angular velocity obtained by multiplying the sum (KN+P) of the prescribed value and the number of pole pairs P by the mechanical angular velocity, and the value of angular velocity obtained by multiplying the difference (KN−P) between the prescribed value and the number of pole pairs P by the mechanical angular velocity, are designated as respective prescribed angular velocities.

Hence, the control apparatus of the invention comprises current passing circuitry configured for passing respective fundamental-frequency sinusoidal-waveform currents (drive currents) through the stator windings, each having at least one harmonic-frequency current superimposed thereon, with the harmonic-frequency current having an angular velocity equal to a prescribed angular velocity. A varying electromagnetic force acting on the rotor, varying at an angular velocity that is a specific suppression-object angular velocity, can thereby be suppressed.

As a result, when vibration of the rotor caused by such a varying electromagnetic force occurs at a frequency close to a resonance frequency of a vibration mode of the rotor, the invention enables resultant vibration of the rotor (and a consequent high level of audible noise) to be suppressed.

DESCRIPTION OF PREFERRED EMBODIMENTS

First Embodiment

Figure 1:
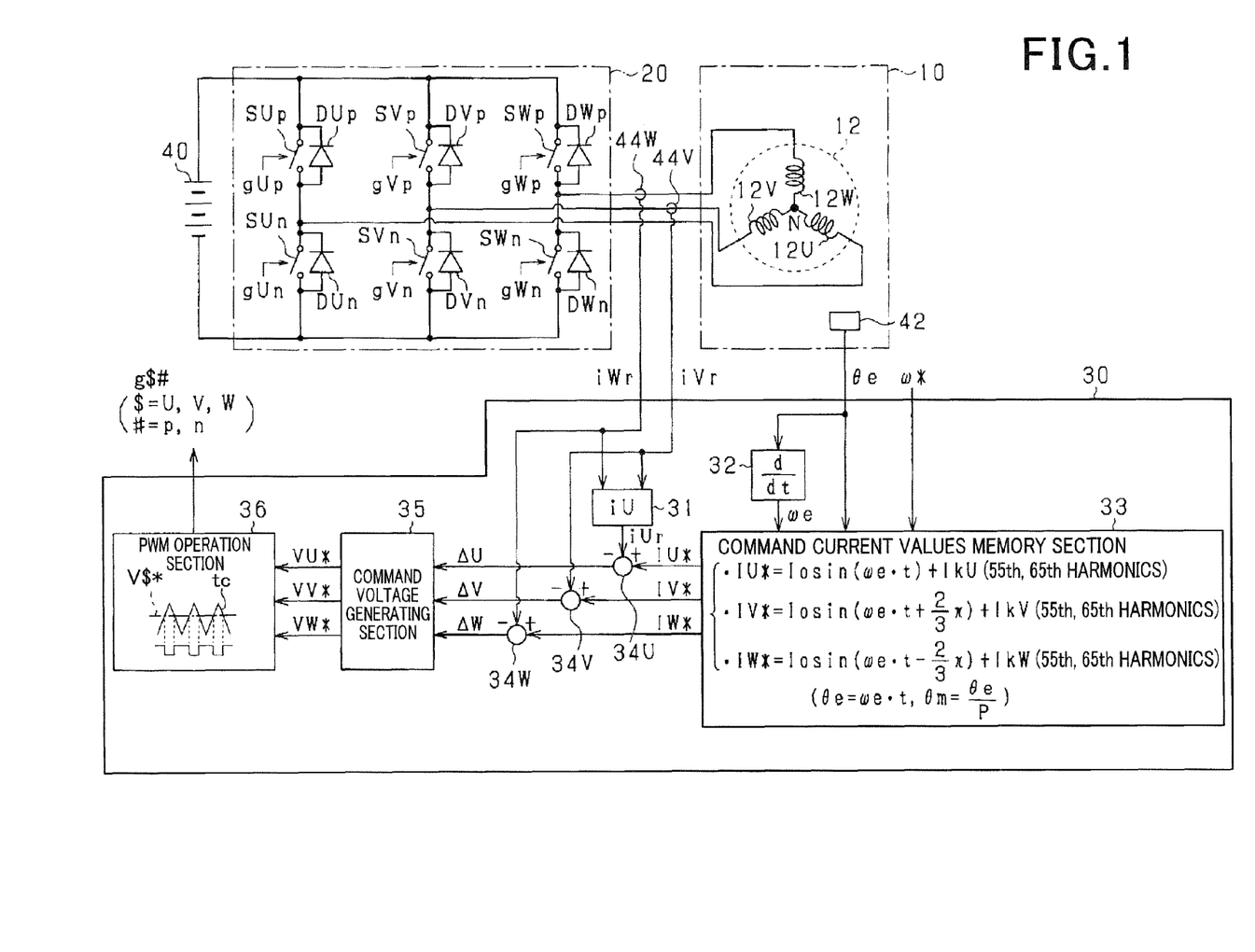
FIG. 1 illustrates the overall configuration of a first embodiment of a motor control system.

A first embodiment will be described in the following referring to FIG. 1, which is a control system for a blower motor of a vehicle air conditioner apparatus. As shown, the vehicle motor control system consists of a 3-phase inverter 20 and a control apparatus 30, and controls a synchronous induction motor (referred to in the following simply as a motor) 10. Current from a DC power source 40 (DC power source) is passed to the motor 10 via the 3-phase inverter 20 as described in the following.

The 3-phase inverter 20 has three pairs of series-connected switching elements respectively corresponding to U, V and W phases, each pair consisting of an upper-arm switching element and a lower-arm switching element. The upper-arm switching elements are collectively designated as S$p ($=U, V, W) and the lower-arm switching elements as S$n in the following. The junction of each upper-arm, lower-arm series-connected switching element pair is connected to one end of a corresponding stator winding of the stator 12 of the motor 10 as shown, i.e., the junctions of the U, V and W switching element pairs being connected to the U, V, W stator windings 12U, 12V, 12W respectively. The other ends of the stator windings 12U, 12V, 12W are connected together as a junction point N. Designating the switching elements collectively as S$# (#=p, n), a free-wheel diode D$# is connected in the inverted direction in parallel with each switching element S$#. Each of the switching elements of this embodiment is a voltage-controlled type of device such as an IGBT or MOS FET.

The motor 10 of this embodiment utilizes permanent magnets to generate the magnetic fields of the rotor 14, however it would be equally possible for these magnetic fields to be generated using field windings.

Figure 2:
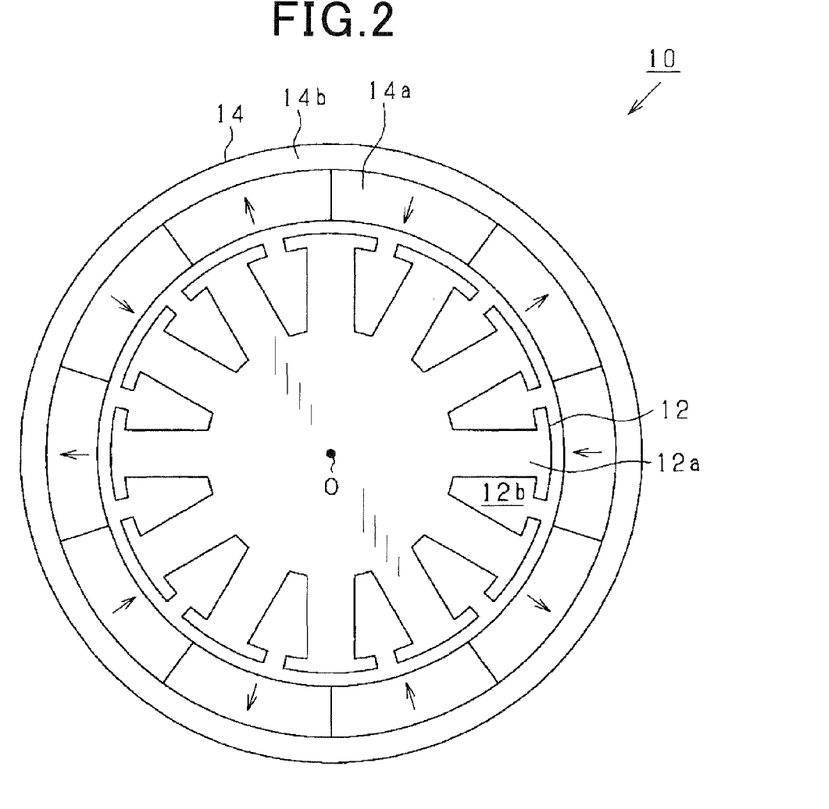
FIG. 2 is a cross-sectional view of a motor in the first embodiment.

As shown in the cross-sectional view of FIG. 2, taken at right angles to the rotor axis of the motor 10 (indicated as O), the motor 10 is an outer-rotor type of motor. Hatching of cross-sectional regions is omitted from FIG. 2.

The motor 10 basically consists of a single stator 12 and an annular rotor 14 which is mounted for rotation with respect to the stator 12, i.e., with a gap being provided between the inner circumferential surface of the rotor 14 and the outer circumferential surface of the stator 12. The motor 10 is controlled by the control apparatus 30 as described in the following.

The rotor 14 is formed of a plurality of permanent magnets 14a which are circumferentially enclosed by a back yoke 14 and which are each in contact with the back yoke 14. Each of the permanent magnets 14a are of identical shape, and are disposed such as to combine to form a single annular magnet as shown. The orientation direction of the north pole of each permanent magnet 14a (radial direction) is indicated by a corresponding arrow, with the S (south) and N (north) polarity directions of the permanent magnets 14a successively alternating around the circumferential direction as indicated in FIG. 2.

The stator 12 is formed with 12 teeth 12a, thereby forming 12 slots 12b, with the teeth 12a and slots 12b being disposed circumferentially with a fixed pitch. With this embodiment the number of pole pairs (i.e., number of adjacent S-polarity and N-polarity pairs), designated as P, is 5, while the number of slots, designated as S, is 12.

Referring again to FIG. 1, the control apparatus 30 is based on a microcomputer (not shown in the drawings) having a memory in which a program has been stored beforehand. The control apparatus 30 executes various functions, described in the following, by executing the instructions of the stored program. Operation signals produced by the control apparatus 30 operate the 3-phase inverter 20 to maintain a control quantity of the motor 10 (with this embodiment, the angular rotation velocity of the rotor 14) at a command value (designated in the following as the command angular velocity ω*). More specifically, the control apparatus 30 generates upper-arm and lower-arm operating signals g$p, g$n for controlling the upper-arm and lower-arm switching elements S$p, S$n of the 3-phase inverter 20. The operating signals g$p, g$n applied to each series-connected pair of upper-arm and lower-arm switching elements S$p, S$n are complementary signals, i.e. the upper-arm and lower-arm switching elements S$p, S$n of each series-connected pair are alternately switched to the ON (conducting) state.

With this embodiment, the required value of the command angular velocity ω* is specified to the control apparatus 30 by an external (higher-level) apparatus (not shown in the drawings).

The rotation angle (electrical angle) θe of the rotor 14 is detected by the rotation angle sensor 42 (e.g., a resolver), while the V-phase and W-phase currents of the motor 10 are detected by the V-phase and W-phase current sensors 44V, 44W. Signals expressing the detected values iWr, iVr of the V-phase and W-phase currents are inputted to the control apparatus 30 together with the detection signal from the rotation angle sensor 42.

The U-phase current calculation section 31 calculates the value of the U-phase current iUr from the detected values iVr and iWr based on Kirchoff's law. The electrical angular velocity calculation section 32 calculates the electrical angular velocity ωe of the rotor 14 by differentiating the successively obtained values of electrical angle θe with respect to time. The mechanical rotation velocity ωm of the rotor 14 is obtained by dividing the electrical angular velocity ωe by the number of pole pairs P.

Based on the command angular velocity ω*, etc., the command current memory section 33 derives command values iU*, iV*, iW* of U-phase, V-phase, W-phase current respectively, with respect to a fixed 3-phase coordinate system. With this embodiment, the command current memory section 33 is based on a non-volatile memory, as described hereinafter.

The U-phase error calculation section 34U obtains a U-phase error delta U by subtracting the command value iU* of U-phase current from the U-phase current value iUr that is outputted from the U-phase current calculation section 31. Similarly, a V-phase error delta V is obtained by the V-phase error calculation section 34V, by subtracting the command value iV* of V-phase current from the V-phase current value iVr, and the W-phase error delta W is obtained by the W-phase error calculation section 34W, by subtracting the command value iW* of W-phase current from the W-phase current value iWr.

The command voltage generating section 35 applies the U-phase, V-phase and W-phase error values of current (delta U, delta V and delta W) to calculate values of U-phase, V-phase and W-phase command voltages (VU*, VV* and VW*), which are inputted to the PWM operation section 36 With this embodiment, the command voltages VU*, W* and VW* are calculated using proportional integral control.

The PWM operation section 36 generates respective operation signals (voltage signals) gU#, gV#, gW# in accordance with the U-phase, V-phase and W-phase command voltages VU*, VV* and VW*. Each of the operation signals gU#, gV#, gW# is generated as a PWM (Pulse Width Modulation) signal, whose pulse width is determined by the value of the corresponding one of the command voltages VU*, W* and VW*. With this embodiment, this is achieved by comparing the magnitudes of each of the command voltages VU*, VV* and VW* with a triangular-waveform carrier signal.

When a rotating magnetic field is generated in the motor 10 by passing the U-phase, V-phase and W-phase currents through the stator windings causing rotation of the rotor 14, resultant varying electromagnetic forces acts on the rotor 14. These varying electromagnetic forces have respective angular variation velocities (12ωm, 24ωm, 36ωm, 48ωm, 60ωm, 70ωm, ...), each angular variation velocity having a value obtained by multiplying the (mechanical) rotation velocity ωm of the rotor 14 by an integer which is a positive multiple of the number of slots S of the motor 10. When the vibration frequency of the rotor 14 caused by such a varying electromagnetic force (i.e., having a specific angular variation velocity) is close to or coincides with a resonance frequency of the rotor (specifically, a toroid mode of the rotor 14 as described hereinafter) the magnetic noise (and hence audible noise) generated by the motor 10 increases greatly. A toroid mode is a mode of periodic deformation of the rotor 14 as an elastic body, causes by vibration forces acting on the rotor 14 in a lateral direction (i.e., at right angles to the axis of the rotor 14). The toroid modes are described more specifically in the following.

Figure 3:
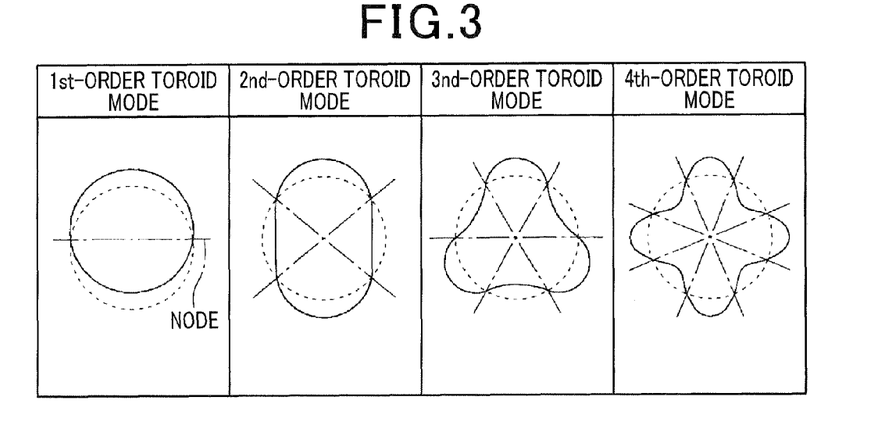
FIG. 3 illustrates respective resonance modes of a rotor of the motor in the first embodiment.

FIG. 3 illustrates the $1^{st}$-order to $4^{th}$-order toroid modes. As shown, the $1^{st}$-order toroid mode is a mode of vibration in which the rotor 14 is displaced while maintaining its original shape (i.e., shape when no deformation force is applied, indicated by the broken-line outline) and swinging with respect to a node as reference. Here, the term "node" signifies a position, as indicated by the chain lines in FIG. 3, at which the shape of the rotor 14 is substantially unchanged from the original shape.

With the $2^{nd}$-order toroid mode, extension occurs radially at two positions which are angularly separated by π radians (as measured with respect to the original shape), while contraction occurs at two positions each of which is angularly separated by π/2 radians from an extension position. With the $3^{rd}$-order toroid mode, the number of positions (as measured with respect to the original shape) at which the shape is contracted is 3, while with the $4^{th}$-order toroid mode, the number of positions at which the shape is contracted is 3.

In each toroid mode, the vibration forces acting on the rotor 14 are rotating electromagnetic forces, produced due to current flow in the stator windings 12$. The order of the toroid mode of vibration which results from these forces can be calculated by dividing the angular extent of one rotation of the rotor 14 (i.e., 2π radians) by the angular distribution period of the repulsive and attractive electromagnetic forces, (i.e., by the angular separation between two adjacent positions of repulsive electromagnetic force or two adjacent positions of attractive electromagnetic force). For example in the case of the $2^{nd}$-order toroid mode as described above, in which magnetic attraction forces and repulsion forces each act radially at two positions which are angularly separated by π radians, the order of the toroid mode is obtained as 2π/π, i.e., 2.

The toroid modes have respective individual resonance frequencies. Resonance of the rotor 14 occurs (i.e., in a specific toroid mode) when the frequency of vibration in the toroid mode coincide with the resonance frequency of the toroid mode.

When the actual vibration frequency thus coincides with the resonance frequency of a toroid mode, the problem arises that the magnetic noise produced by the motor 10 increases substantially, causing a large increase in noise within the audible frequency range.

With this embodiment, to overcome this problem, the waveforms of each of the drive currents of respective phases of the stator 12 are controlled such as to suppress a varying electromagnetic force which can produce such rotor vibration, as described in the following.

The vibration force F produced by a magnetic pole of the rotor 14 is proportional to the magnetic flux φ of the pole and to the magnetizing force H of the stator windings 12$ through which drive currents are passed (i.e., assumed to be sinusoidal-waveform currents varying at a fundamental frequency value), as expressed by the following equation (1):

$$F \propto \phi \cdot H \tag{eq1}$$

The magnetizing force H is proportional to the permeance A of the stator, to the number of turns N of the stator windings 12$, and to the value of current I which flows through each of the stator windings 12$, respectively. Hence the following equation (2) can be derived from equation (1) above:

$$F \propto \phi \cdot A \cdot N \cdot I \tag{eq2}$$

Since the permeance A of the stator varies circumferentially (i.e., angular variation within a range of 2π radians) with a period that is m times the slot number S (where m is a positive integer), the following equation (3) can be derived from equation (2) above:

$$A \propto A_0 = \sum_{m=1}^{\infty} [A_m \cos(m \cdot S \cdot \theta_m)] \tag{eq3}$$

In equation (3), A0 denotes the average value of the permeance A. When the rotor 14 rotates at angular velocity ωm (radians/sec), a harmonic-frequency current Ik flows in the stator winding 12$ as expressed by the following equation (4):

$$I_k \propto I_a \cdot \sin[(K \pm P)\omega_m \cdot t \mp P \cdot \theta_m] \tag{eq4}$$

In equation (4), t denotes time, Ia denotes the amplitude of the harmonic-frequency current Ik, θm (radians) denotes the rotation angle of the rotor, and K denotes the smallest common multiple of the number of slots S and double the number of pole pairs P and. K, 2K, 3K, 4K, etc., may be utilized in equation (4), such a value being designated herein as a prescribed value, i.e., K multiplied by a positive integer N. However in this description of the first embodiment, the prescribed value is assumed to be K, i.e., N is assumed to be 1.

The vibration force F produced by a magnetic pole of the rotor 14, due to the harmonic-frequency current Ik flowing in a stator winding 12$, can be expressed by the $$F_k \propto \phi \cdot N \cdot I_a \left\{ A_0 + \sum_{m=1}^{\infty} [A_m \cos(m \cdot S \cdot \theta_m)] \right\} \sin[(K \pm P)\omega_m \cdot t \mp P \cdot \theta_m] \tag{eq5}$$

following equation (5), derived from equations (2) to (4):

With this embodiment, since S=12, P=5, K=60, the following equation (6) is $$F_k \propto \phi \cdot N \cdot I_a \left\{ A_0 + \sum_{m=1}^{\infty} [A_m \cos(12m \cdot \theta_m)] \right\} \sin[(60 \pm 5)\omega_m \cdot t \mp 5\theta_m] \quad \text{(eq6)}$$

obtained by inserting these values into equation (5):

In the following unless otherwise indicated, "angular velocity of the rotor 14" signifies the mechanical angular velocity. When the rotor 14 is rotating at an angular velocity $\omega m$, the relationship between the (mechanical) angle $\theta m$ of the rotor and $\omega m$ is [$\theta m = \omega m^* t$]. Equation (6) can thus be expressed in the form of the following equation (7):

$$F_k \propto \phi \cdot N \cdot I_a \cdot \left\{ A_0 + \sum_{m=1}^{\infty} [A_m \cos(12m \cdot \omega_m \cdot t)] \right\} \quad \text{(eq7)}$$

$$\sin[(60 \pm 5)\omega_m \cdot t \mp 5\omega_m \cdot t] =$$

$$\phi \cdot N \cdot I_a \cdot \left\{ A_0 \sin(60\omega_m \cdot t) + \sum_{m=1}^{\infty} [A_m \cos(12m \cdot \omega_m \cdot t) \sin((60\omega_m \cdot t)] \right\}$$

Using integration of trigonometric functions, equation (7) can be expressed $$F_k \propto \phi \cdot N \cdot I_a \cdot \left\{ A_0 \cdot \sin(60\omega_m \cdot t) + \right. \quad \text{(eq8)}$$

$$\left. \sum_{m=1}^{\infty} \left[ \frac{A_m}{2} \sin((60 + 12m) \cdot \omega_m \cdot t) + \frac{A_m}{2} \sin((60 - 12m) \cdot \omega_m \cdot t) \right] \right\}$$

as the following equation (8):

A current having an angular variation frequency (K−P)$\omega m$ (i.e., the product of the angular velocity corn by the difference (K−P) between the least common multiple K and the number of pole pairs P) will be designated as the (K−P)$^{th}$ harmonic-frequency current, while a current having an angular variation frequency (K+P)$\omega m$ is will be designated as the (K+P)$^{th}$ harmonic-frequency current.

Equations (6) and (8) show the following. Varying electromagnetic forces acting on the rotor 14, having respective angular velocities K$\omega m$, (K+S)$\omega m$ and (K−S)$\omega m$, (with this embodiment, 60$\omega m$, 72$\omega m$ and 48$\omega m$), can be considered to result from a specific pair of induced harmonic-frequency currents which flow in the stator windings of each phase, i.e., the (K−P)$^{th}$ and (K+P)$^{th}$ harmonic-frequency currents.

Hence, equations (6) to (8) show that any of the K-order, (K−S)-order and (K−S)-order electromagnetic forces can be suppressed by causing a (K−P)$^{th}$ harmonic-frequency current and a (K+P)$^{th}$ harmonic-frequency current of suitable amplitudes to flow in each of the stator windings 12$, superimposed on the fundamental-frequency sinusoidal-waveform drive current.

As can be understood from equations (7) and (8), the (K−S)-order and (K−S)-order electromagnetic forces are generated, when (K−P)$^{th}$ and (K+P)$^{th}$ harmonic-frequency currents flow in the stator windings 12$, due to the fact that the K-order varying electromagnetic force acting on the rotor 14 is frequency-modulated by S$\omega m$ (the product of the number of slots S and rotor angular velocity $\omega m$.

The values (K+P)$\omega m$ and (K−P)$\omega m$ defined above correspond to respective "prescribed angular velocities" as recited in the appended claims. The values obtained by multiplying (K+S)$\omega m$ and (K−S)$\omega m$ defined above correspond to respective "suppression-object angular velocities" as recited in the claims.

With this embodiment the number of slots S is 12, and double the number of pole pairs P is 10 , so that the lowest common multiple K is 60. Hence the 48-order, 60-order and 72-order varying electromagnetic forces are suppressed by causing a 55$^{th}$ harmonic-frequency current and a 65$^{th}$ harmonic-frequency current, of appropriate amplitude, to flow in each of the stator windings 12$. To achieve this, information is stored in the command current memory section 33 for use in generating (with respect to each of the U, V and W phases) a signal expressing a fundamental-frequency sinusoidally varying current, varying at the electrical angular velocity $\omega e$ and having the 55$^{th}$ harmonic-frequency current and 65$^{th}$ harmonic-frequency current superimposed thereon. These currents are expressed by equation (9) below, in which IkU, IkV and IkW respectively designate the superimposed 55$^{th}$ and 65$^{th}$ harmonic-frequency currents of the U, V and W phases.

$$\left. \begin{array}{l} IU^* = Io\sin(\omega_e \cdot t) + IkU(55^{th}, 65^{th}) \\ IV^* = Io\sin(\omega_e \cdot t + 2\pi/3) + IkV(55^{th}, 65^{th}) \\ IW^* = Io\sin(\omega_e \cdot t + 2\pi/3) + IkW(55^{th}, 65^{th}) \end{array} \right\} \quad \text{(Eq9)}$$

The first items in the right side of equation (9) are the fundamental-frequency sinusoidally varying currents of the U, V, W phases, mutually differing in phase by 120°. The harmonic-frequency currents Ik$ ($=U, V, W) of the U, V and W phases are set with amplitude values appropriate for suppressing the 48-order. 60-order and 72-order electromagnetic forces as described above. With this embodiment, the respective harmonic-frequency currents of the U, V and W phases are of identical form, and mutually differ in phase by 120° (i.e., differ in electrical angle $\theta e$ by 120°). Values expressing the $ phase command currents I$* are held stored in a non-volatile memory of the command current memory section 33 in data map form, related to values of command (mechanical) angular velocity $\omega^*$, electrical angle $\theta e$, mechanical angle $\theta m$, and electrical angular velocity $\theta e$ of the rotor 14.

Hence, each of the $ phase command currents I$* consists of a fundamental-frequency sinusoidal-waveform current varying at the electrical angular velocity $\omega e$, which is superimposed with corresponding harmonic-frequency currents Ik (55$^{th}$ and 65$^{th}$ harmonics of the fundamental frequency).

The command current memory section 33 repetitively executes a control program, e.g., which is held stored in a ROM. In each of successive control periods of the program execution, signal values expressing the command currents IU*, IV* and IW* are read out from the memory 33 in accordance with the currently received values of command angular velocity $\omega^*$, electrical angle $\theta e$, mechanical angle $\theta m$, and electrical angular velocity $\omega e$. These values of the command currents IU*, IV* and IW* are inputted to the U-phase error calculation section 34U, the V-phase error calculation section 34V and the W-phase error calculation section 34W respectively.

Figure 4:
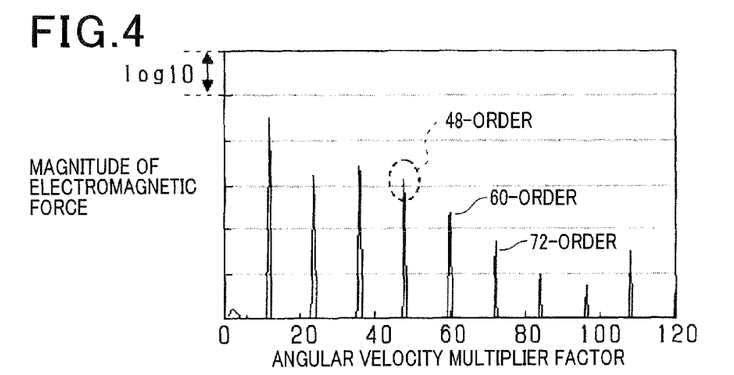
FIG. 4 is a graph illustrating the relationship between amplitude and frequency of varying electromagnetic forces acting on the rotor of the motor of the first embodiment, without superimposition of the $55^{th}$ harmonic-frequency current on the drive currents of respective phases of the motor.
Figure 5:
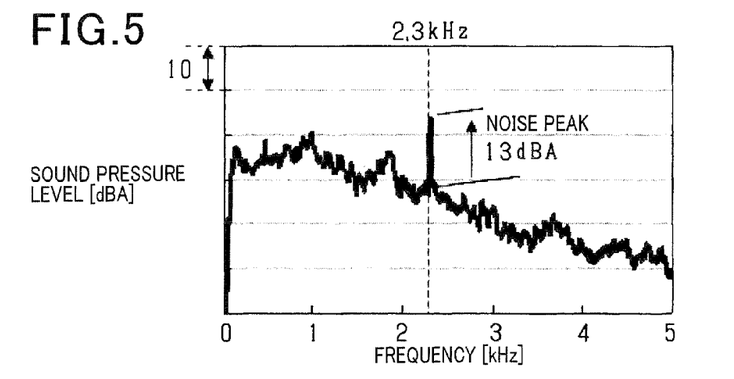
FIG. 5 is a graph corresponding to FIG. 4, illustrating measured results of the relationship between audible noise level generated by the motor without superimposition of the $55^{th}$ harmonic-frequency current.
Figure 6:
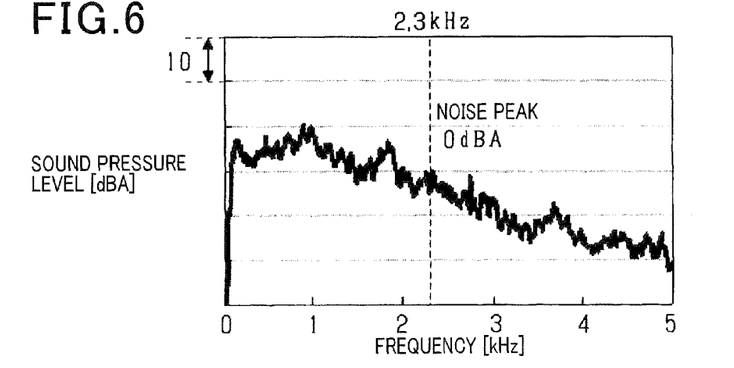
FIG. 6 is a graph of measured results showing a reduction of the audible noise level of the motor by superimposing the $55^{th}$ harmonic-frequency current on the drive currents of respective phases of the motor.

FIGS. 4, 5 and 6 show effects obtained by superimposing the 55$^{th}$ harmonic-frequency current on the fundamental-frequency drive currents of each of the phase windings 12U, 12V, 12W of the motor 10. With this example, the 48-order varying electromagnetic force (i.e., having an angular velocity of 48$\omega m$) produces vibration of the rotor 14 at a frequency (2.2. kHz) that is close to a resonance frequency (2.3 kHz) of the rotor 14 of the motor 10, in the 2$^{nd}$-order toroid mode of the rotor.

FIG. 4 shows the relationship between amplitude and frequency of varying electromagnetic forces acting on to the rotor 14 when the 55th harmonic-frequency current is not superimposed on the fundamental-frequency drive currents of each of the phase windings 12U, 12V, 12W of the motor 10.

FIG. 5 shows measured results of the audible noise level produced by the motor 10 when the 55th harmonic-frequency current is not superimposed, while FIG. 6 shows the corresponding results for the case when the 55th harmonic-frequency current is superimposed on the fundamental-frequency drive currents of each of the phase windings.

As shown in FIG. 5 there is a large-amplitude noise peak, due to resonance vibration of the rotor 14, produced by the motor 10 at 2.3 kHz when the 55th harmonic-frequency current is not superimposed As shown in FIG. 6, the noise peak becomes reduced by 13 dBA, by superimposing the 55th harmonic-frequency current on the drive current of each phase winding as described above, and hence the noise peak is effectively suppressed.

The effects provided by the above embodiment can be summarized as follows:

(1) The 55th harmonic-frequency current and 65th harmonic-frequency current (respective high-frequency sinusoidal-waveform currents) are superimposed on a fundamental-frequency sinusoidal-waveform current, to constitute respective drive currents which are supplied to the U, V and W phase windings of the motor 10, for thereby suppressing at least a specific one of the 60-order, 48-order, and 72-order varying electromagnetic forces. As a result, if the rotor has a resonance frequency of a vibration mode that is within (or close to) the variation frequency of one of these varying electromagnetic forces, excessive audible noise produced due to rotor vibration at the resonance frequency can be effectively suppressed.

The above embodiment has been described assuming that both the 55th harmonic-frequency current and the 65th harmonic-frequency current are superimposed on the fundamental-frequency-waveform drive current of each phase. This is preferable, however it may be possible to achieve a desired result by superimposing only an appropriate one of the 55th and 65th harmonic-frequency currents.

(2) With the above embodiment, by using a synchronous motor 10 having 10 poles and 12 stator slots, the lowest common multiple K becomes 60, and it is ensured that the condition is satisfied whereby K±S is not a positive integral multiple of the number of pole pairs.

With the prior art of reference document 1 above however, a synchronous motor having 8 poles and 48 stator slots (i.e., 2P=8 and S=48) is described. In that case, the lowest common multiple K of the number of slots and double the number of poles is 48, so that (K±S) become 0 and 96. This is due to the fact that one of the values of (K±S) is an integral multiple of the number of poles. Thus if a motor having the configuration described in reference document 1 were to be utilized as the motor 10 of the above embodiment, it would not be possible to employ harmonic-frequency currents to suppress the above-described varying electromagnetic forces which act on the rotor.

(3) The above embodiment has been described for the case of an outer-rotor type of synchronous motor, having a rotor 14 which is of hollow configuration. With such a rotor configuration, a considerable degree of deformation of the rotor occurs when there is vibration at a resonance frequency of the rotor, which can result in a high level of noise within the audible frequency range. Hence the above embodiment provides substantial advantages, by enabling suppression of the varying electromagnetic forces which produce deformation of such a type of rotor.

Second Embodiment

A second embodiment will be described, with the description centered upon points of difference from the first embodiment above.

Figure 8:
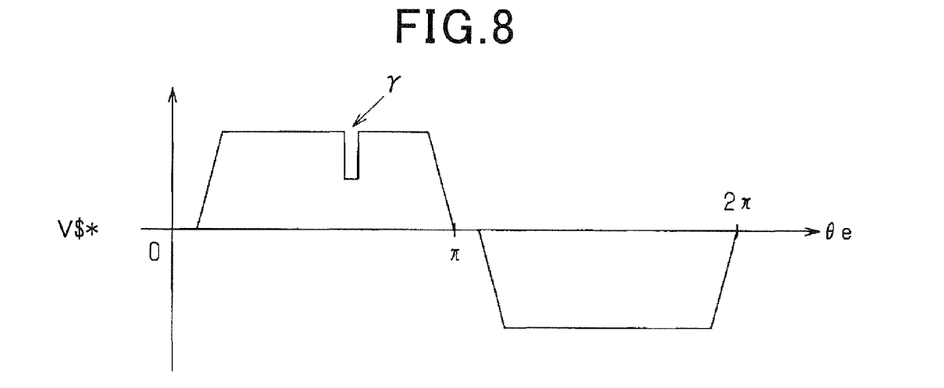
FIG. 8 shows a trapezoidal waveform of a drive voltage of the motor of the second embodiment.

With the second embodiment, trapezoidal-waveform drive voltages having the waveform shown in FIG. 8, are applied by PWM (pulse width modulation) to the 12$x of the motor 10.

Figure 7:
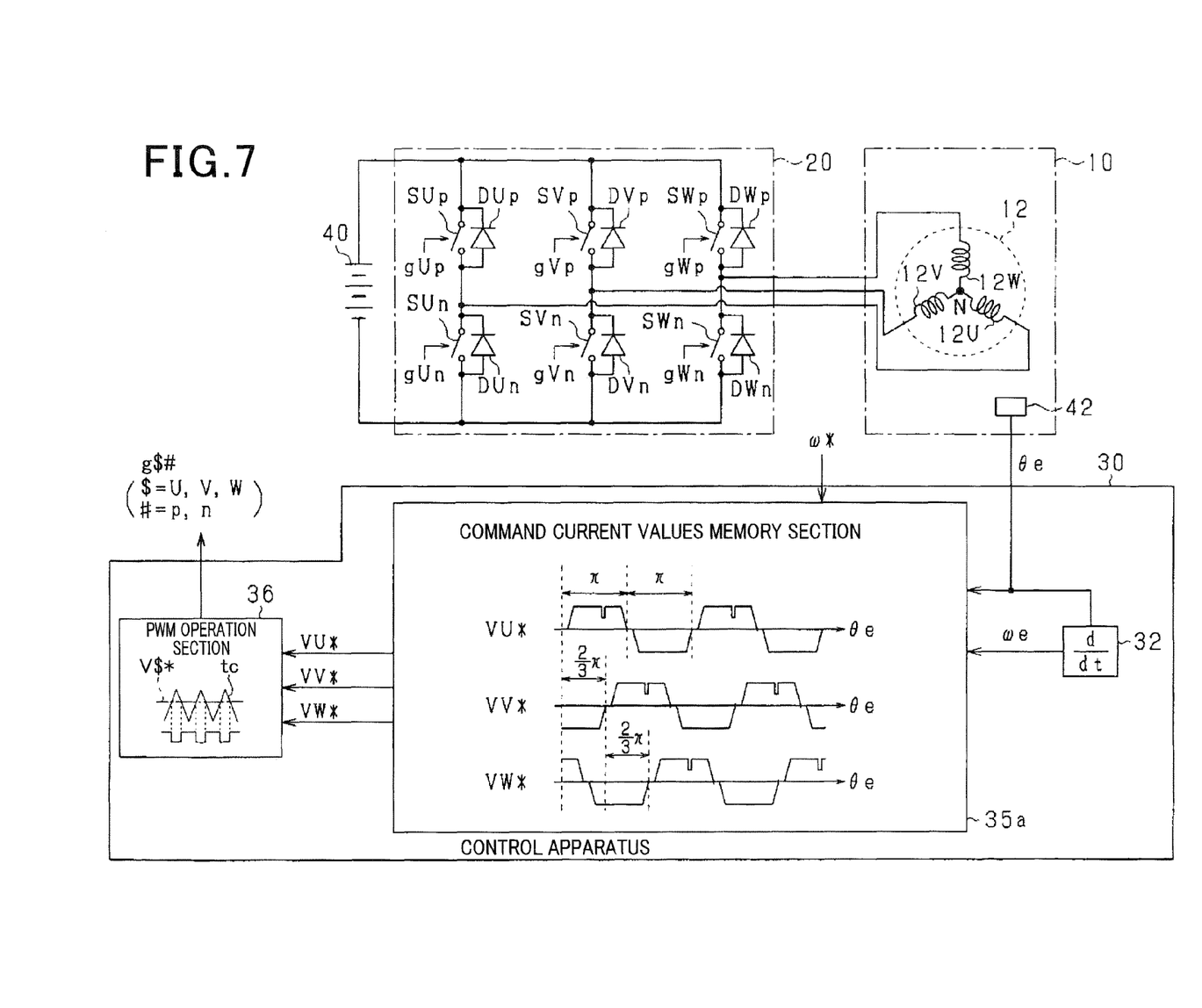
FIG. 7 illustrates the overall configuration of a second embodiment of a motor control system.

FIG. 7 shows the overall configuration of the motor control system of this embodiment, with those parts of the system corresponding to parts of the first embodiment (FIG. 1) designated by corresponding reference numerals to those of the first embodiment.

As shown in FIG. 7, the control apparatus 30 of this embodiment incorporates a command voltage calculation section 35a, based on a non-volatile memory having information stored therein expressing trapezoidal-waveform U, V, W phase command voltages VU*, VV*, VW*, the stored information being related to values of command angular velocity ω*, electrical angle θe, mechanical angle θm, and electrical angular velocity ωe of the motor 10. Each of the U, V, W phase command voltages VU*, VV*, VW* have an identical trapezoidal waveform, and mutually differ in phase by 120°. The trapezoidal-waveform U, V, W phase command voltages VU*, VV*, VW* are each read out from the memory, as respective signals, in accordance with the currently inputted values of command angular velocity ω*, electrical angle θe, mechanical angle θm, and electrical angular velocity ωe), and inputted to the PWM operation section 36. The command voltages VU*, VV*, VW* are thereby respectively pulse width modulated, and the resultant operation signals gU#, gV#, gW# are applied to the corresponding switching elements in the 3-phase inverter 20.

As shown in FIG. 7, ON operation command intervals (e.g., intervals in which the switching element gUp is held closed, in the case of the command voltage VU*) and OFF operation command intervals (e.g., in which the switching element gUn is held closed) of each of the command voltage VU*, VV*, VW* differ in phase by 180°.

The trapezoidal waveform of each of the command voltage VU*, VV*, VW* is based on a rectangular waveform, as delineated by the broken-line vertical portions in the waveform diagram in FIG. 7.

The waveform of each command voltage VU*, VV*, VW* is shaped such that, when a (pulse width modulated) command voltage is applied to the switching elements of the corresponding stator winding 12U, 12V or 12W, the resultant current which flows in the stator winding consists of a fundamental-frequency-waveform current having angular frequency ωe, with the 55th and 65th harmonic-frequency currents superimposed.

The amplitude and phase of the 55th and 65th harmonic-frequency currents are set appropriately by adjusting the slopes of the rising and falling edges of the command voltage trapezoidal waveform.

In addition with this embodiment, the amplitude and phase of the 55th and 65th harmonic-frequency currents are further adjusted by removing a specific portion γ of the command voltage trapezoidal waveform, as shown in FIG. 8.

Similar effects to those of the first embodiment can be obtained with the second embodiment.

Third Embodiment

A third embodiment will be described referring to FIGS. 9 and 10, with the description centered upon points of difference from the first embodiment above.

Figure 9:
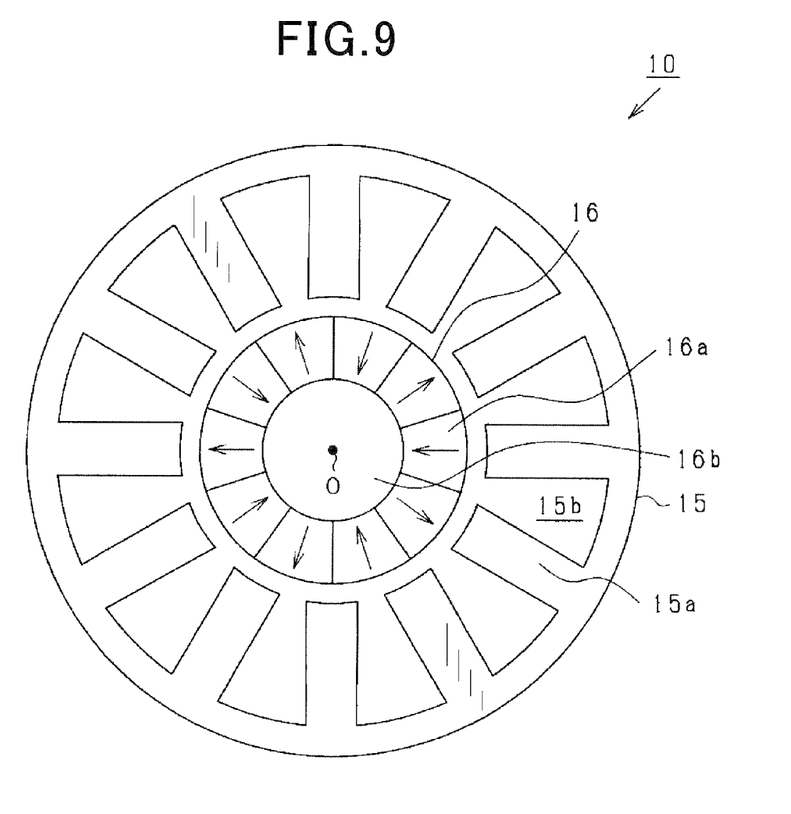
FIG. 9 is a cross-sectional view of a motor of a third embodiment.

As shown in FIG. 9, the motor 10 of this embodiment is of inner-rotor type. FIG. 9 is a cross-sectional view taken at right angles to the rotor axis of the motor 10 (indicated as O). Hatching of cross-sectional regions is omitted from FIG. 9.

The motor 10 has a stator 15 and a rotor 16 which is rotatably mounted with respect to the stator 15 and is disposed within an inner circumference of the stator 15, with a gap provided between the inner periphery of the stator 15 and the outer periphery of the rotor 16.

The rotor 16 is formed with 10 permanent magnets 16a which are each of identical shape, and a rotor core 16b which connects together the permanent magnets 16a to form a single magnet. The polarity directions of the permanent magnets 16a (oriented radially with respect to the axis of rotation of the rotor 16) successively alternate circumferentially, as indicated by the arrows in FIG. 9. The stator 15 is formed with 12 teeth 15a and 15 slots 15b, disposed circumferentially with fixed pitch around the stator 15.

Figure 10:
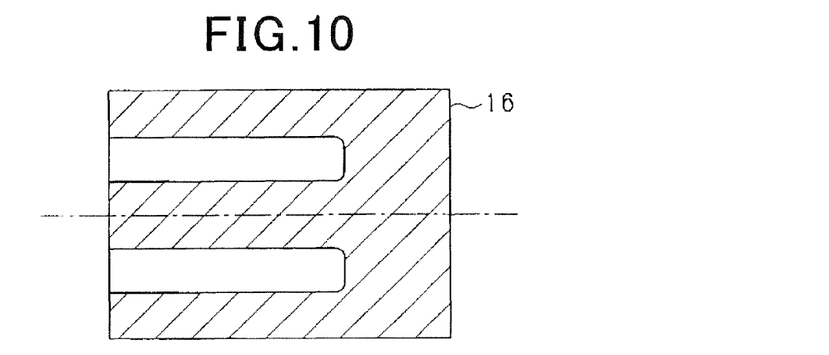
FIG. 10 is a partial cross-sectional view of the motor of the third embodiment.

To reduce the moment of inertia of the rotor 16, as shown in FIG. 10, the rotor 16 is of hollowed-out configuration, with an axially extending cavity formed therein. The cross-sectional view of FIG. 10 is taken in a plane parallel to the rotation axis of the rotor 16 (indicated by the chain line portion in FIG. 10), passing through that axis.

Similar effects to those of the first embodiment can be obtained with the third embodiment.

Other Embodiments

Figure 11:
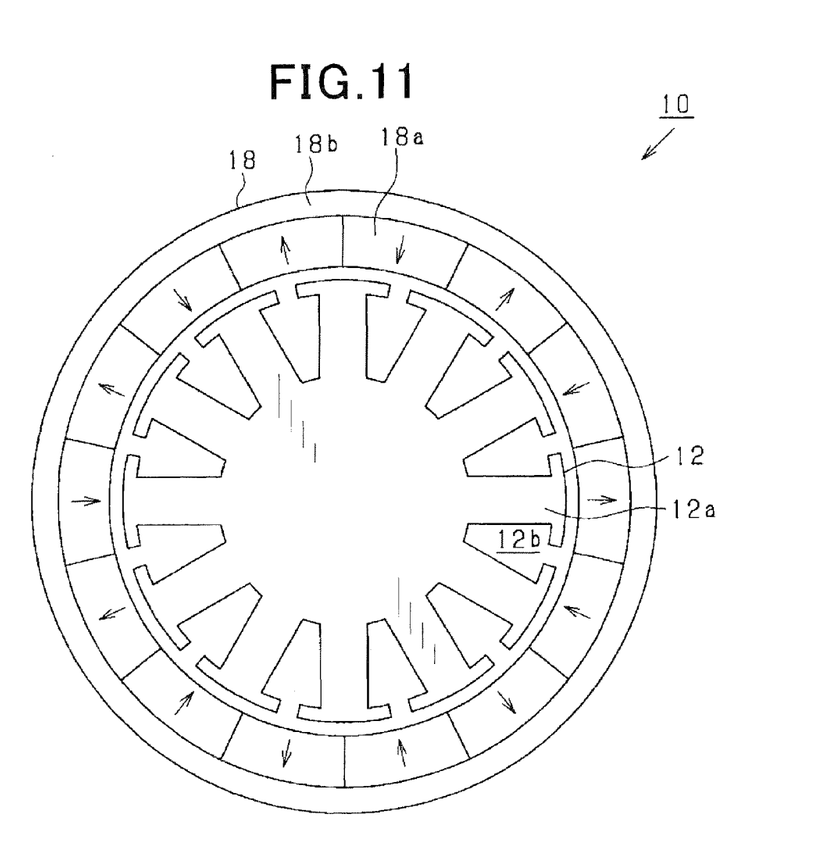
FIG. 11 is a cross-sectional view of a motor of a fourth embodiment.

The following modifications to the above embodiments may be envisaged:

(1) The motor 10 of first embodiment above could be modified to the form shown in FIG. 11, in which the number of pole pairs P is 7 and the number of slots S is 12. The motor 10 of FIG. 11 is an outer-rotor type of synchronous motor, as for that of the first embodiment shown in FIG. 2, and differs from the configuration shown in FIG. 2 only with respect to the number of pole pairs P. The poles 18a of the rotor 18 of this modified embodiment are connected by a magnet yoke 18b.

In this case, the lowest common multiple K of double the number of pole pairs P (7) and the number of slots S (12) is 84, so that (K−P) and (K+P) are respectively 77 and 91, while (K−S) and (K+S) are respectively 72 and 96. Hence based on equations (6) to (9) above as described for the first embodiment, the 72-order and 96-order varying electromagnetic forces can be suppressed by causing each of respective U, V, W phase currents which flow in the stator windings of the motor 10 to have a $77^{th}$ harmonic-frequency current and $91^{st}$ harmonic-frequency current superimposed on a fundamental-frequency-waveform current.

With such a motor 10, having 14 poles and 12 slots, the necessary condition is satisfied whereby neither of the values (K−S) and (K+S) is a positive integral multiple of the number of pole pairs (7).

(2) The invention is not limited to the case in which the prescribed value is obtained by multiplying the lowest common multiple K of the number of slots S and double the number of pole pairs P by a positive integer equal to 1. It would be equally possible to multiply the lowest common multiple K by a positive integer equal to 2 or greater. Specifically, with the first embodiment since the lowest common multiple K is 60, the prescribed value could be changed to 120, 180, 240, . . . . If the prescribed value is made 120 for example, then the prescribed angular velocities become $(120\pm5)\omega m$ and the suppression-object angular velocities become $(120\pm12)\omega m$. It has been found through investigation by the assignees of the present invention that, in such a case too, varying electromagnetic forces acting on the rotor of a synchronous motor can be selectively suppressed as described for the above embodiments.

(3) The scope of the invention is not limited to the case of a synchronous motor having 10 poles and 12 slots or having 14 poles and 12 slots. It is possible to use other values for the number of poles and/or number of slots of the motor, so long as the value [K.n±S] (where n is a positive integer) is not an integral multiple of the number of pole pairs P, and the number of slots S is greater than or equal to 3. It has been found through investigation by the assignees of the present invention that, in such a case too, varying electromagnetic forces acting on the rotor of a synchronous motor can be suppressed as described for the above embodiments.

The invention is not limited in application to a 3-phase synchronous motor, but would be equally applicable in general to a polyphase synchronous rotary machine having 3 or more phases. Furthermore the invention is not limited in application to a permanent magnet type of synchronous machine having permanent magnets installed on the rotor, but would be equally applicable to a field winding type of synchronous machine.

What is claimed is:

1. A control apparatus for a synchronous rotary machine, the rotary machine comprising a rotor having P pole pairs, where P is a positive integer, and a stator having S slots, where S is a positive integer equal to 3 or greater, the stator wound with stator windings of respective phases;
   wherein
   designating a prescribed value as a value obtained by multiplying a lowest common multiple K of the number of slots S and double the number of pole pairs P by a positive integer,
   designating a value obtained by multiplying a sum of the prescribed value and the number of slots S by a mechanical angular velocity of the rotor, and a value obtained by multiplying a difference between the prescribed value and the number of slots S by the mechanical angular velocity of the rotor, as respective suppression-object angular velocities, and
   designating a first angular velocity and a second angular velocity as respective prescribed angular velocities, the first angular velocity being obtained by multiplying a sum of the prescribed value and the number of pole pairs P by the mechanical angular velocity of the rotor and the second angular velocity being obtained by multiplying a difference between the prescribed value and the number of pole pairs P by the mechanical angular velocity of the rotor,
   the control apparatus comprises current passing circuitry configured for passing fundamental-frequency sinusoidal-waveform currents through the stator windings, each fundamental-frequency sinusoidal-waveform current having superimposed thereon at least one harmonic-frequency current having an angular velocity equal to a prescribed angular velocity, for thereby suppressing a varying electromagnetic force acting on the rotor and having an angular variation velocity equal to a suppression-object angular velocity.

2. The control apparatus for a synchronous rotary machine as claimed in claim 1, wherein a harmonic-frequency current having an angular velocity equal to the first prescribed angular velocity, and a harmonic-frequency current having an angular velocity equal to the second prescribed angular velocity, are respectively superimposed on each of the fundamental-frequency sinusoidal-waveform currents.

3. The control apparatus for a synchronous rotary machine as claimed in claim 1, wherein the respective values of the number of pole pairs P and the number of slots S are predetermined for ensuring that neither the sum of the prescribed value and the number of slots S nor the difference between the prescribed value and the number of slots S is a positive integral multiple of the number of pole pairs P.

4. The control apparatus for a synchronous rotary machine as claimed in claim 3, wherein the number of pole pairs P is 5 and the number of slots S is 12.

5. The control apparatus for a synchronous rotary machine as claimed in claim 3, wherein the number of pole pairs P is 7 and the number of slots S is 12.

6. The control apparatus for a synchronous rotary machine as claimed in claim 1, wherein the rotor is of hollowed-out configuration.

7. The control apparatus for a synchronous rotary machine as claimed in claim 6, wherein the rotary machine is of outer-rotor type and wherein the rotor is of toroidal shape, with the stator disposed within an inner periphery of the rotor.

8. The control apparatus for a synchronous rotary machine as claimed in claim 1, wherein the current passing circuitry comprises:

a memory having stored therein drive current information stored therein expressing the fundamental-frequency-waveform currents as a sinusoidal-waveform signals each having an angular velocity equal to the electrical angular velocity of the rotor and having a signal corresponding to the harmonic-frequency current(s) superimposed thereon;

switching elements controllable for passing current through the stator winding of the rotary machine; and operation circuitry configured for controlling the switching elements to pass drive currents through the stator windings in accordance with the drive current information stored in the memory.

9. The control apparatus for a synchronous rotary machine as claimed in claim 1, wherein the current passing circuitry comprises:

command voltage calculation circuitry configured for calculating a waveform of a trapezoidal-waveform command voltage and for generating command voltage signals each having the waveform of the trapezoidal-waveform command voltage and varying at an angular variation velocity equal to an electrical angular velocity of the rotary machine, switching elements controllable for passing current through the stator winding of the rotary machine, and operation circuitry configured for controlling the switching elements to pass drive currents through the stator winding in accordance with the command voltage signals.

* * * * *